C. SCHWEDLER.
BASKET MAKING MACHINE.
APPLICATION FILED FEB. 20, 1917.

1,267,125.

Patented May 21, 1918.
8 SHEETS—SHEET 1.

Witnesses:
Richard Scherpe
Paul Frese

Inventor:
Karl Schwedler

C. SCHWEDLER.
BASKET MAKING MACHINE.
APPLICATION FILED FEB. 20, 1917.

1,267,125.

Patented May 21, 1918.
8 SHEETS—SHEET 5.

Witnesses:
Richard Scherp
Paul Frese

Inventor:
Carl Schwedler

C. SCHWEDLER.
BASKET MAKING MACHINE.
APPLICATION FILED FEB. 20, 1917.

1,267,125.

Patented May 21, 1918.
8 SHEETS—SHEET 6.

Witnesses:
Richard Scherpe
Paul Frese

Inventor:
Carl Schwedler

C. SCHWEDLER.
BASKET MAKING MACHINE.
APPLICATION FILED FEB. 20, 1917.

1,267,125.

Patented May 21, 1918.
8 SHEETS—SHEET 8.

Witnesses:
Richard Scherpe
Paul Frese

Inventor:
Carl Schwedler

UNITED STATES PATENT OFFICE.

CARL SCHWEDLER, OF BERLIN-NEUKÖLLN, GERMANY, ASSIGNOR OF ONE-HALF TO FRIEDRICH VOIGT, OF NORDHAUSEN, AM HARZ, GERMANY.

BASKET-MAKING MACHINE.

1,267,125.  Specification of Letters Patent.  Patented May 21, 1918.

Application filed February 20, 1917. Serial No. 149,921.

*To all whom it may concern:*

Be it known that I, CARL SCHWEDLER, a citizen of Germany, and residing at Berlin-Neukölln, Germany, have invented certain new and useful Improvements in Basket-Making Machines, of which the following is a specification.

My invention relates to the art of making baskets, and its object being to provide a machine by means of which baskets of any kind, bottom and lid included, may be manufactured mechanically.

In order that my invention be more clearly understood I have illustrated an embodiment of the same, by way of example, in the accompanying drawings in which like letters of reference denote like parts throughout. Fig. 4 is a top view of the column carrying the actuating mechanism. Fig. 5 is a plan view showing the working table with actuating mechanism supported thereon and the working frame in its initial position. Fig. 9 is a sectional view, on an enlarged scale, on the line C—C in Fig. 6. Fig. 10 is a sectional view on the line D—D of Fig. 9. Fig. 18 is a view against the longitudinal side of the working frame, while Fig. 20 is a top view of the working frame, Fig. 21 a section on the line G—G of Fig. 20, and Fig. 22 a section on the line H—H of Fig. 20. In Figs. 28 to 36 inclusive, I have shown a modified construction of the actuating mechanism for producing the movements of the basket during the weaving operation; Fig. 28 shows a side elevation, Fig. 29 a sectional plan view on the line A—A of Fig. 28, and Fig. 30 a sectional view on the line B—B of Fig. 28.

Figures 2, 4, 5, 9, 10:
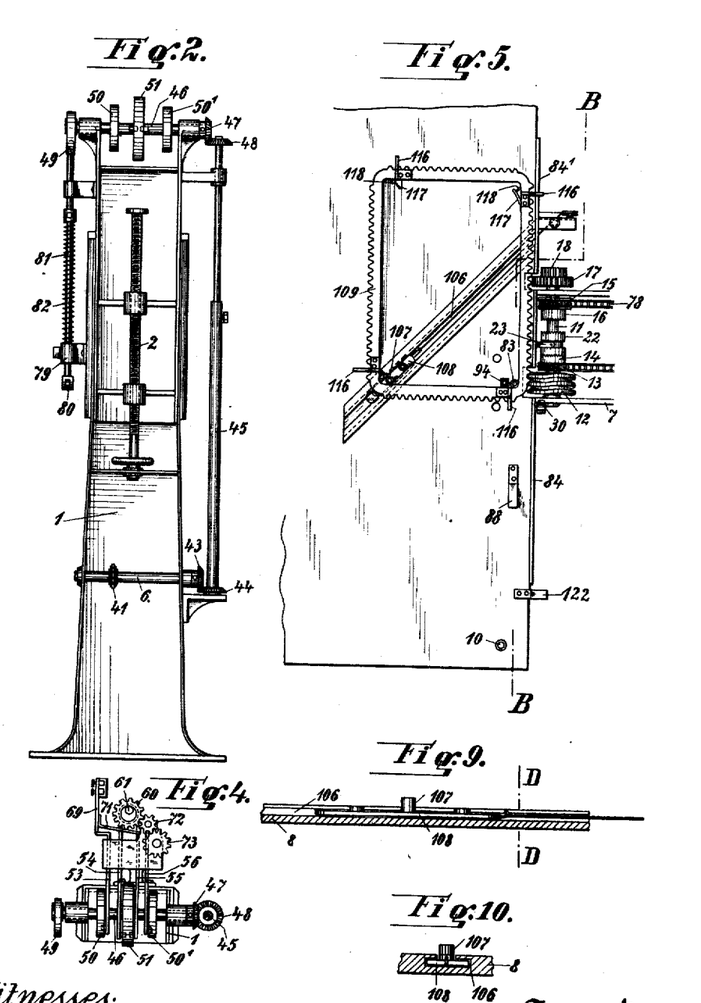
Figure 12:
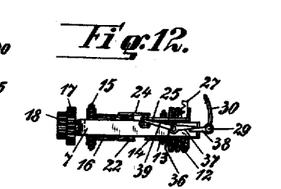
Fig. 12 is a front view of the parts shown in Fig. 11.
Figure 13:
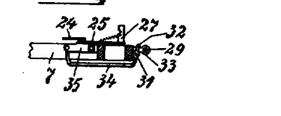
Fig. 13 is a sectional view on the line E—E of Fig. 11.

Referring to the drawings, my novel machine comprises a column 1 which in its elevation is adjustable, by means of an adjusting spindle 2, see Fig. 2, to any size of basket required to be manufactured. The lower part of column 1 supports the main operating shaft 3 on which a belt pulley 4 and a toothed wheel 5 are fixedly mounted. A frame 7 is oscillatorily supported on a shaft 6 mounted within the column 1. The frame is adapted to support a plate or table 8 which may be secured thereto by any suitable means, and is designed to carry the frame work on which the basket or like article is manufactured. The oscillatorily supported frame 7 can be adjusted within its plane of oscillation by means of a screw threaded spindle 9. The table 8 is provided with vertically adjustable legs 10. A shaft 11 is mounted in suitable bearings upon the frame and carries within the space confined by the frame 7, at one end a loose worm wheel 12 which is fixedly connected with a coupling member 14 and a sprocket wheel 13, and at the opposite end a sprocket wheel 15 which is fixedly connected with a coupling member 16. An extension of the shaft 11 carries outside of the frame 7 two fixedly secured gear wheels 17 and 18; the gear wheel 18 meshing with a gear wheel 19 revolubly mounted on a pivot 20 laterally projecting from frame 7. The pivot 20 carries a further gear wheel 21 which meshes with the above mentioned gear wheel 5 on the operating shaft 3. The coupling teeth on the faces of the coupling members 14 and 16 are effective in opposite directions. Intermediate these coupling members 14 and 16, there is provided a third coupling member 22 which is shiftably mounted on the shaft 11 and connected therewith by means of a key so as to partake of the revolution of the shaft 11 and adapted to be longitudinally shifted into operative engagement with either of the coupling members 14 and 16. The shifting movement is performed by means of an operating lever fulcrumed on the frame 7 and engaging with an arm 23 an annular groove of the shiftable member 22, while its other arm 24 is pivotally connected by means of a link 25 to an arm 26 of another double arm lever 26, 40, which is fulcrumed on a bracket of the frame 7. An extension of the link 25 is formed into an upwardly extending arm 27 which projects through an opening in the plate 8, see Figs. 12 and 13. The arm 24 is subjected to the action of a spring 28 secured at the side of the frame 7 and tending to pull the arm 24 toward the frame.

Figure 3:
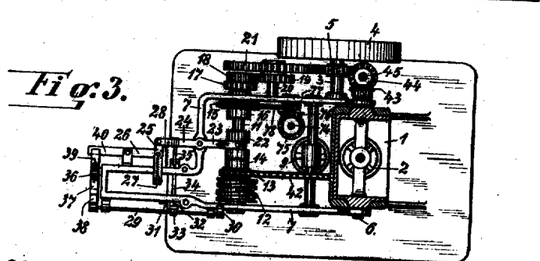
Fig. 3 is a sectional plan view on the line A—A of Fig. 1.
Figure 11:
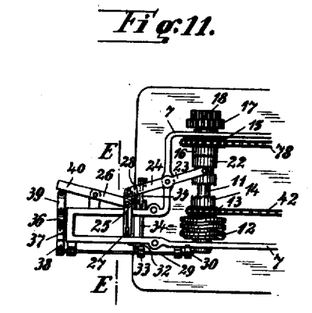
Fig. 11 is a view similar to Fig. 3 but showing parts of the actuating mechanism in another position.

A shaft 29 is mounted at one side on the frame 7. One end of the shaft 29 is provided with an arm 30 projecting upward in proximity to the edge of the plate 8; see Figs. 5 and 12. A bent lever 32, 34, is fulcrumed at 31 and has its arm 32 extending upwardly intermediate the frame 7 and the shaft 29. This arm 32 coöperates with a cam 33 secured upon the shaft 29. A spring indicated in Fig. 13 tends to maintain the lever in its normal position. The horizontally extending arm 34 of the said bent lever 32, 34, has its free end connected to a pivotally supported locking member 35 which can be caused to bear against the arm 24 controlling by means of its opposite arm 23 the shiftable clutch member 22; the locking member 35 when in operation retains the lever 24 against the action of the spring 28 in one of its operative positions, viz. in which the member 22 is coupled to the member 14. Another double arm lever is fulcrumed at 36, see Figs. 3 and 12, and has the end of its arm 37 in contact with the lifter arm 38 fixedly secured upon the shaft 29. The other arm rests with its tapering end 39 upon the end of the arm 40 of a hereinbefore mentioned double arm lever 40, 26, the other arm of which is pivoted to the link 25; see Figs. 3 and 11.

A sprocket wheel 41 is fixed upon the shaft 6 and operatively connected with the sprocket wheel 13 by means of a chain 42. At one end the shaft 6 is provided with a bevel wheel 43 which meshes with another bevel wheel 44 mounted upon a vertically disposed shaft 45; see Fig. 2. The shaft 45 is adjustable in its vertical extent in order to be able to follow the vertical adjustment of the column 1.

Figure 16:
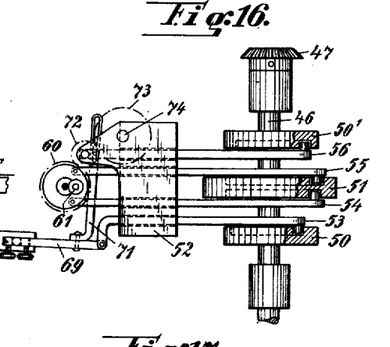
Fig. 16 shows the actuating mechanism for the feeding tube and the stays for the uprights, in a top view, and Fig. 17 in elevation, both views being on an enlarged scale.

The head of the column 1 supports a shaft 46 one end of which is provided with a bevel wheel 47 meshing with a bevel wheel 48 secured at the upper end of the upright shaft 45. At its opposite end the shaft 46 carries a cam disk 49 and intermediate its supporting bearings three cam disks 50, 50', and 51, of which the latter one is furnished with a cam groove in each of its faces while each of the cam disks 50 and 50' is but provided with a groove on its inner face; see Fig. 16.

Figure 14:
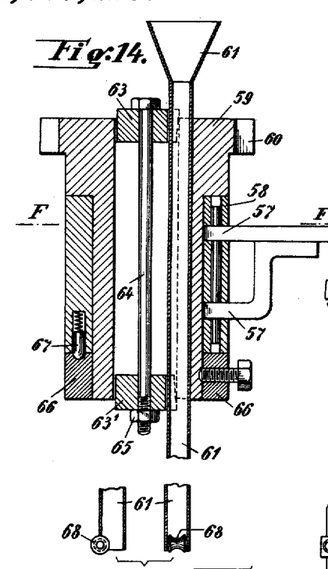
Fig. 14 illustrates, on an enlarged scale, a sectional view of the weaving head.
Figure 15:
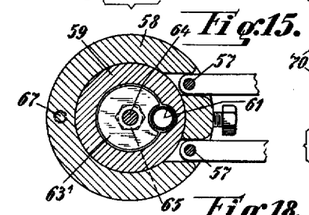
Fig. 15 is a sectional view on the line F—F of Fig. 14.

At the head of the column 1 is laterally provided a bracket 52 which is adapted to horizontally guide four rods 53, 54, 55, and 56, which reciprocates within bores of the same. The ends of the rods 54 and 55 engage by means of suitable studs the grooves of the cam disk 51, while the opposite ends of these rods are connected by means of pivots 57 to a cylindrical member 58; see Figs. 14, 15. The member 58 embraces a tubular member 59 which is enlarged at its upper end and thereon provided with a gear wheel 60; see Fig. 14. The interior of the tubular member 59 is provided with a vertical groove for the reception of the feeding tube 61 through which the material 62 (Fig. 1) for the basket to be manufactured passes. There are provided two circular clamping blocks 63 and 63' which are interconnected by means of a screw bolt 64 and a nut 65. By means of these clamping blocks the feeding tube 61 can be secured vertically in any required circular position within the tubular member 59. Upon the lower end of the tubular body 59 a collar 66 is detachably secured by means of a screw and is provided with a suitable indention for the reception of a spring subjected locking bolt 67 by means of which the tubular body 59 is yieldably coupled to the sleeve 58. The upper end of the feeding tube 61 is preferably formed like a funnel. At the lower end of the feeding tube 61 and at one side thereof is mounted a guide roll 68 designed to prevent the material passing through the feeding tube from becoming injured by the edge of the feeding tube.

The rod 53 engages by means of a suitable stud the groove in the face of the cam disk 50, while the rod 56 similarly engages the groove in the face of the cam disk 50'. The free end of the rod 53 is pivotally connected to an arm 69 on which are mounted the stays 70, 70' for the uprights of the basket. The arm 69 is further provided with a laterally extending arm 71 which engages by means of a pin and slot connection the end of the rod 56. On the bracket 52 there are mounted two interengaging gear wheels 72, 72. When the rods 54 and 55 under the control of their respective cam grooves have performed their backward stroke, the gear wheel 60 on the tubular body 59 is caused to engage the gear wheel 72. The gear wheel 73 is secured at the end of an upright shaft 74 (see Fig. 1) which is vertically adjustable and carries at its lower end a bevel wheel 75 which is mounted in a suitable bearing of the frame 7 and meshes with a bevel wheel 76 mounted on a pivot extending laterally from the inner side of the frame 7; see Fig. 3. The same stud carries a sprocket wheel 77 which is operatively connected with the sprocket wheel 15 by means of a chain 78.

A bracket 79 is secured on the column 1 so as to extend laterally therefrom and carries an oscillatorily supported bar 80 designed to act as a beater. The rear end of this bar is pivotally connected with a vertical rod 81 which is slidingly mounted in suitable bearings of the column 1 and extends with its upper end below the cam disk 49 and is acted upon by the latter at each revolution of the shaft 46. A helical spring 82 wound around the rod 81 and resting with its lower end upon the bracket 79 is adapted to be tensioned by means of a collar secured upon the rod 81, when the latter is being pushed down by the cam 49.

The plate 8 mounted upon the frame 7 carries a pin 83 which preferably is provided with an idle roll; see Fig. 5. That side of the plate 8 adjoining the column 1 is provided with guiding bars 84, 84'.

Figures 7, 8:
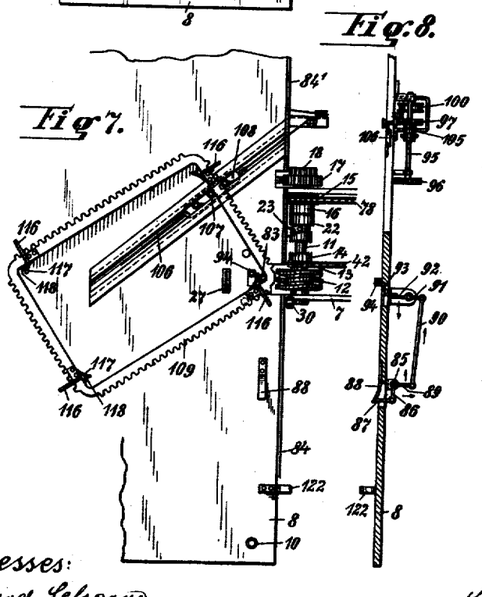
Fig. 8 is a sectional view of the table on the line B—B of Fig. 5.

Underneath the plate 8 a bell crank lever 86, 89 is fulcrumed at 85; see Fig. 8, and carries at the end of its arm 86 a pin 87 projecting through an opening in the plate 8 and thereby raises a plate spring 88. The other arm 86 of the said bell crank lever is pivotally connected by means of a link 90 to an arm 91 of a double arm lever 91, 92, pivotally supported on the plate 8. The other arm 92 bears against a pin 93 extending from a movable stud 94.

Underneath the plate 8, there is mounted a shaft 95 having a gear wheel 96 fixedly secured at one end and meshing with the aforementioned gear wheel 17. A gear wheel 97 with a coupling member attached thereto is loosely mounted at the opposite end of the shaft. The gear wheel 97 engages a gear wheel 99 (Fig. 6) secured on a shaft 98 which is provided with a rope pulley 100; see Figs. 6 and 8.

Figure 6:
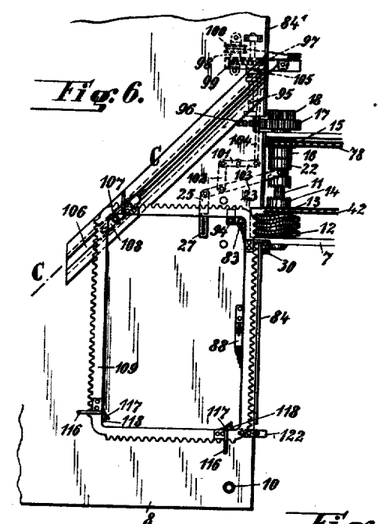
Figs. 6 and 7 are views similar to Fig. 5 but showing the frame in various advanced positions.

A double arm lever is mounted underneath the plate 8 and has its arm 101 pivotally connected to the aforementioned arm 24 by means of a link 102; see Fig. 6. To the other arm 103 a rod 104 is pivotally connected by means of which can be shifted a clutch member 105 slidably mounted upon the shaft 95 with which the same is connected. The plate 8 is further provided with an obliquely disposed guiding groove 106 preferably of the section shown in Fig. 10 and engaged by a block 108 provided with pins 107 projecting over the surface of the table 8. The last named block is connected with one end of a cord or rope which passes over suitable idlers to the pulley 100 to which the other end of the rope is secured.

The device by means of which the basket is given the required form comprises a frame 109 shaped in conformity with the basket shape required. The four outer edges of the frame 109 are provided with teeth.

Figure 1:
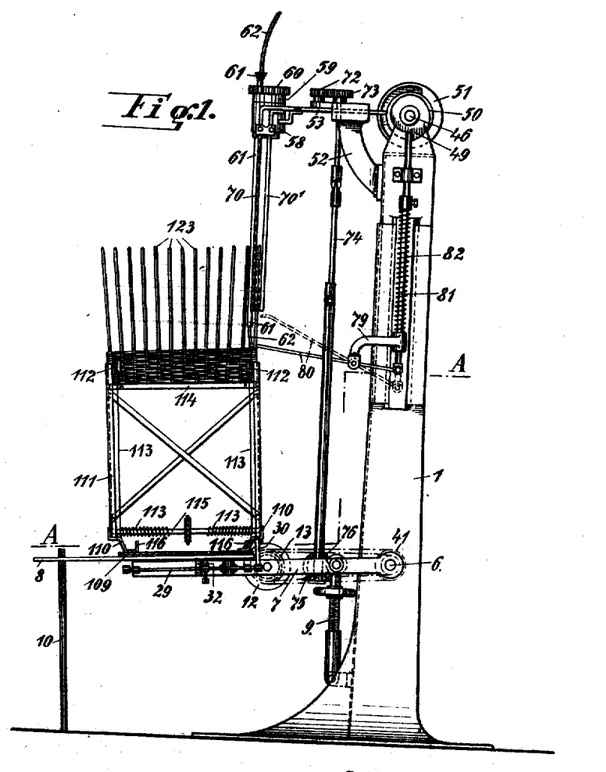
Figure 1 illustrates a side elevation of my novel machine and Fig. 2 a rear view of the same in elevation.

A box-like structure 111 is secured upon the frame 109 by means of brackets 110; see Fig. 1. At the upper corners of the structure 111 are provided rolls 112 over which pass ropes 113 having their ends secured to a plate 114 which is suspended thereby within the structure 111. The opposite ends of the ropes 113 are wound around shafts 115, and 115', (Figs. 18 and 19) mounted in suitable bearings in the lower part of the structure 111. At each corner of the frame 109 is secured a horizontally projecting stop arm 116. On the inner sides of the frame 109 and in the vicinity of each stop arm 116, are secured springs 117 carrying pins 118 at their free ends as shown in Figs. 5, 6, 7.

Figure 18:
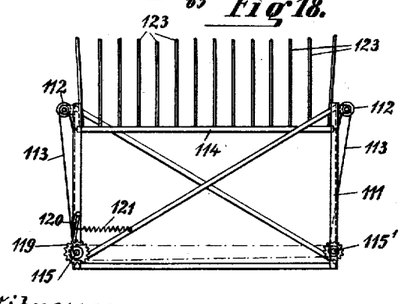
Figure 19:
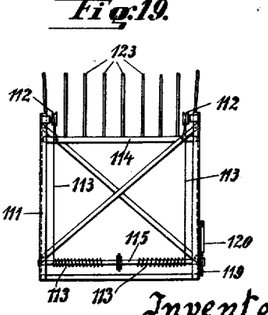
Fig. 19 is a view against the transverse side of the same.
Figures 20, 21, 22:
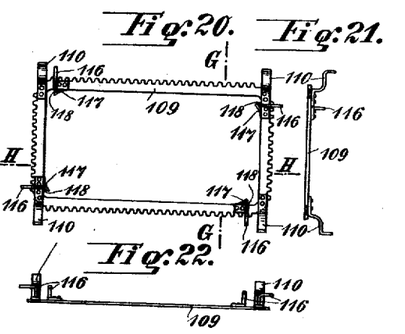

The shafts 115, 115' are provided with sprocket wheels which are interconnected by means of a chain indicated in dotted lines in Fig. 18. The shaft 115 carries at one end an intermittent movement wheel 119 which normally is locked against revolution by means of a pawl 120 held in operative position by the action of a spring 121. The intermittent movement wheel 119 is disposed within the path of action of a stop arm 122 secured on the plate 8. 123 designates the uprights of the basket to be manufactured.

The mode of operation of the machine so far described, is as follows:

Supposing a rectangular basket is to be manufactured having slightly inclined side walls as indicated in Fig. 1. The frame 109, see Figs. 5, 6, and 7, is placed upon the working table 8 in such a manner as to insure that the pin 83 with its roller occupies its position within one corner of the frame, as is shown in Fig. 5. Upon the plate 114 I secure a finished woven bottom, and I then give the uprights 123 their proper position as determined by the desired shape of the basket. The table 8 is now adjusted by means of the adjusting device 9 so that the uprights 123 occupy their proper working position, that is, stand vertically in line with the feeding tube 61 through which the material 62 is to be fed. The plate 114 is in its uppermost position and the feeding tube 61 has its lower end depending just over the bottom of the basket to be woven. The shiftable clutch member 22 is in operative position on the right wherein the clutch member is coupled to the clutch part 14; see Fig. 3. The shiftable clutch member 22 is locked in this position by means of the locking member 35. Now, on setting the machine in operation by means of the belt pulley 4, the revolving movement of the latter will be transmitted to the worm 12 which engages the teeth of the operating frame 109 and thereby causes the latter to move toward the right between the guide roller 83 and the guide bars 84, 84'. Over the chain gear 13, 42, 41, 6, and the bevel wheels 43, 44, movement is transmitted to the vertical shaft 45, which drives the shaft 46 and the cam disks 50, 50', 51 through the agency of the bevel gear 48, 47. The cam disk 51 imparts a reciprocatory movement to the part 58 through the rods 54, 55; at the same time the feeding head is oscillated about its axis alternately to the right and to the left, on account of the operative grooves of the cam disk 51 being differently cut. The tube 61 which feeds the material 62 is thus caused to first pass between two adjacent uprights in one direction and immediately thereafter between the following pair of uprights in the opposite direction because of the fact that, during the while, the frame 109 is advanced simultaneously. In this manner the well known undulatory weaving motion is produced.

Figure 24:
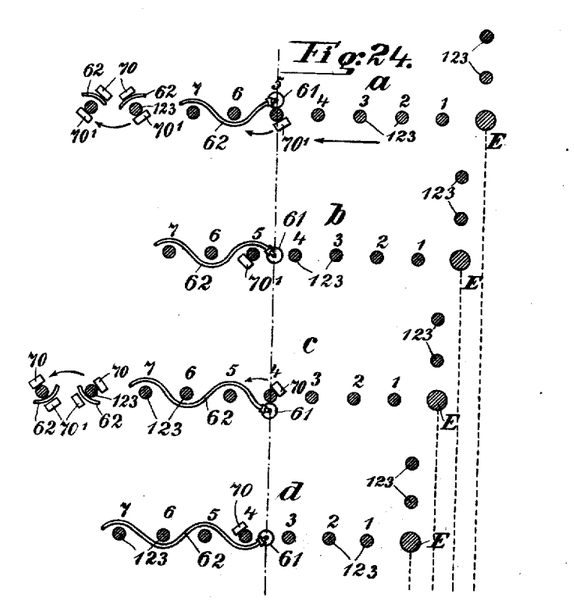
In Fig. 24 various positions of the feeding tube and the stays for the uprights are illustrated.

In Fig. 24 are illustrated various positions of the feeding tube 61 in relation to the uprights 123. In position 24ᵃ the feeding tube after having passed between the uprights $u^5$ and $u^6$ from the outer side toward the inner side is being shown behind the upright $u^5$. In position 24ᵇ the feeding tube is advanced and is now intermediate the uprights $u^5$ and $u^4$. In position 24ᶜ the feeding tube has completed this passage and is in front of the upright $u^4$; while in position 24ᵈ the feeding tube has commenced passing through the next pair of uprights $u^4$ and $u^3$ and is shown to be intermediate the same.

Figure 17:
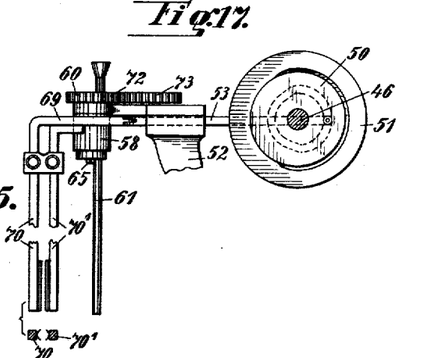

From the positions illustrated it will be seen that the guide roll 68 disposed at the lower end of the feeding tube 61 for the purpose of guiding the fed material is adjusted automatically to the varying direction in which the weaving work proceeds. In order to prevent the uprights from altering their position during the weaving work by giving way under the pressure exerted by the feeding tube 61, the arm 69 is provided carrying two spaced stays 70, 70' for the uprights; see Figs. 16, 17. Through the agency of the rods 53 and 56 which are controlled by the grooved cam disks 50 and 50', the arm 69 has imparted to it a reciprocatory movement as well as a rocking movement whereby in accordance with the position of the feeding tube 61 one or the other of the stays 70, 70' is caused to contact with the respective upright from the side opposite to the position of the feeding tube. That is to say so long as the feeding tube is on the inner side of an upright the outer stay 70' will afford the required support for the upright while a rod 62 is being woven around it by means of the feeding tube. When the feeding tube is passing from the inner toward the outer side of the basket the arm 69 is being rocked thus bringing the other stay, 70, in contact with the succeeding upright around which the feeding head is now placing a rod 62.

The positions and movements of the stays for the uprights are likewise illustrated in Fig. 24. In the position 24ᵃ, the stay 70' supports the upright 5 from the outer side. Since the structure carrying the uprights is continually moving in the direction indicated by the arrow, the stay is required to perform a revolving movement in addition to its reciprocatory motion. On the left of the position 24ᵃ the stays 70, 70' are separately illustrated for the purpose of explaining this circular movement which is indicated as to the course it pursues by an arrow; the advanced position on the left hand side and pointed at by the arrow corresponds to the position of the stay 70' shown in Fig. 24ᵇ. On the left of Fig. 24ᶜ I have again indicated the positions of the stays 70, 70', this time the stay 70 being in operative position as a support of the upright 123, and is gradually changing its position in the direction indicated by an arrow as shown; the final position of the stay 70 indicated corresponds to the position shown in Fig. 24ᵈ.

The reciprocatory movement of the stays 70, 70' together with the rod 69 on which they are mounted, is produced by the grooved cam disk 50 controlling the movements of the connection rod 53, while the oscillatory movement is controlled by the grooved cam disk 50' by means of the rod 56 acting upon the rod 71.

The weaving motion proceeds continuously during the period in which the frame 109 follows a straight path of movement, the latter being actuated by the driving worm 12. Before the end of a toothed frame side reaches the worm 12, a stop arm 116 strikes the arm 30 of the shaft 29 and causes the latter to rotate whereby the cam 33 of the shaft 29 actuates the spring subjected arm 32 of the elbow lever 32, 34. The arm 34 swings downward and moves the locking piece 35 out of its operative position whereby the arm 24 is released. Under the action of the spring 28 the arm 24 is caused to shift the median clutch member 22 out of engagement with the clutch part 14 to couple the same to the clutch part 16 of the sprocket wheel 15. In order to make sure that the release of one clutch gear and the reëngaging of the other is properly performed, I have provided an auxiliary push lever. When the shaft 29 rotates, as hereinbefore described, the arm 38 acts upon an arm 37 of a double lever which has its other arm 39 provided with a tapering cam face which is in contact with the arm 40 and displaces the latter by turning it about its fulcrum, in the manner shown in Fig. 11; thereby exerting, through the agency of the arm 26 and the link 25, a pull upon the arm 24. This pulling action coöperates with the action of the spring 28 to insure the above described shifting of the clutch member 22 toward the clutch part 16.

Through thus shifting the clutch the revolution of the driving worm is stopped and the movement of the frame 109 ceases. In the meantime, the guiding stud 83 has passed over the resilient latch 118 and attained its position within the corner of the frame 109, as shown in Fig. 6, wherein the stud is locked by the said latch against return movement. When the clutch is shifted, as has been above described, motion is transmitted to the wheel 15 which revolves the wheel 77 through the chain gearing shown. While the arm 23 is being shifted into the position shown in Fig. 6, the link 102 and the lever 101, 103 are shifted simultaneously. This results in a shifting of the clutch member 105 whereby the latter is caused to engage with the clutch face of the gear wheel 97 which thereupon partakes of the revolving movement of the shaft 95. The gear wheel 97 being in mesh with the gear wheel 98, the movement of rotation is transmitted to the shaft 98 carrying the rope pulley 100, and the latter is caused to wind up the rope which is secured with its other end to the guided block 108 and draws the same on within the guiding path 106. By means of the pin 107 the frame 109 is compelled to partake of the movement of the guided block 108 and thereby performs a turning for 90° about the pin 83 which now acts as a fulcrum. At the conclusion of the thus produced swinging movement the frame 109 strikes the stop 27, and the link 25 fixedly connected therewith and adapted to oscillate the lever arm 24, is pressed back thereby, see Figs. 7 and 11. This restores the lever 24 and the median clutch member 22 to its initial position wherein the latter engages the clutch member 14. Through the action of a spring, shown in Fig. 13 as pressing laterally against the arm 32 of the elbow lever 32, 34, the locking piece 35 is lifted again and placed in front of the arm 24, maintaining the latter in its operative initial position.

However as long as the clutch members 22 and 16 are still engaged, the corner weaving proceeds and the mechanism therefore is set into operation by the following means.

Through the chain 78 the wheel 77 and the bevel wheels 76, 75 are caused to revolve in order to operate the shaft 74 and the gear wheel 73 which latter acts upon the gear wheel 72. At each return stroke of the sleeve 58 the gear wheel 60 is caused, each time, to engage the gear wheel 72 which, however, is of no consequence as long as the clutch members 22 and 16 are disengaged, that is when no motion is transmitted to the wheel 72. When the clutch members 22 and 16 are operative, the power transmission from the member 14 over the chain 42 to the shaft 6 discontinues and the sleeve 58 remains stationary. In order to be able to place the individual rods of superposed layers on alternate sides of the uprights, it is requisite that the number of uprights used be an odd one, so that the feeding tube on reaching the end of one side wall of the basket comes to a temporary standstill on one side, for instance, the inner side, of the last upright, while at the end of the next side wall the feeding tube occupies the opposite position relatively to the upright, that is, stands in front of it.

Figure 23:
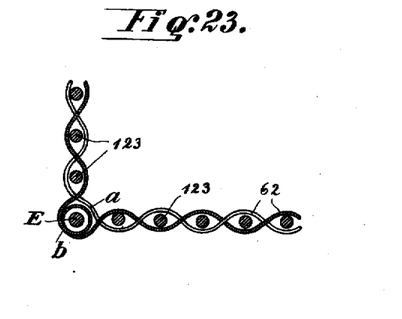
Fig. 23 illustrates a corner portion of the work produced.

Supposing the weaving work is carried out up to the corner upright E in Fig. 23, and the weaving cylinder is stopped at the inner side, the gear wheel 60 will then be removed from the gear wheel 72, see Fig. 1. For this reason, although the actuating mechanism is reversed, the weaving cylinder remains stationary during the now following turning movement of the frame 109, and the weaving of the other side portion is then continued immediately; see Fig. 23. When the weaving cylinder stops on the outer side of the last upright, the gear wheel 60 will then be in mesh with the gear wheel 72, see Fig. 17. Since the cylinder remains in this position and the gear wheel 72 is set into motion in consequence of the reversal of clutch coupling, the gear wheel 60 and the tubular body 59 shown to be integral therewith, starts to revolve. The yielding locking pin 67 is pressed back and permits this revolution, independent of the sleeve 58. While the tubular body 59 is revolving the feeding tube 61 performs a circular movement around the corner stay and winds the rod b around the said corner upright in the manner clearly indicated in Fig. 23.

At the conclusion of the circular movement, the coupling pin 67 reënters the hole within the collar 66 and recouples the tubular body 59 with the sleeve 58. The turning movement of the frame 109 is concluded likewise, and the clutch coupling is automatically shifted into its initial position with the median clutch member 22 engaging the clutch member 14, whereupon the normal weaving motion along the next straight side of the frame is continued.

While the weaving work thus proceeds the height of the basket walls increases which necessitates a lowering of the yet unfinished basket for a corresponding amount. This is performed by means of the intermittent motion wheel 119 which is advanced by the stationary stop 122 on the table 8 upon the conclusion of each full turning movement of the frame 109. This causes the shafts 115, 115' to unwind a corresponding portion of the ropes 113 which results in a lowering of the plate 114 suspended thereon.

The pin 87 (Fig. 8) serves to guide the frame 109 along the bar 84'. However, to move the pin 87 out of the way when the frame is to perform the required turning movement, I have provided the movable stud 94. When the frame is advanced until the pin 83 lies a short space before the corner of the frame the stud 94 strikes against the transversal frame part and moves in conjunction therewith a short distance; see Fig. 6. The downward directed projection 93 of the thus moving stud 94 causes the lever 92, 91 to swing thereby drawing the link 90 in the direction of the arrow shown in Fig. 8 and swinging the bell crank lever 85, 86 which withdraws the pin 87 and the plate spring 88 out of the path of movement of the frame 109. The latter can now freely turn. As soon as the pressure of the frame upon the stud 94 ceases, the plate spring 88 returns the parts into the normal position.

I have provided a beater 80 for the purpose of placing the superposed layers closely upon one another; the beater being actuated by means of the cam disk 49 controlling the rod 81 against the action of the spring 82. At each turn of the cam disk 49 the bar 81 is moved downward and the beater 80 swung into the position indicated in dotted lines in Fig. 1. When the end of the rod 81 slides off the raised portion of the cam disk the spring 82 operates to throw the beater 80 down upon the last wound layer which is thereby pressed upon the layer previously woven.

Figure 25:
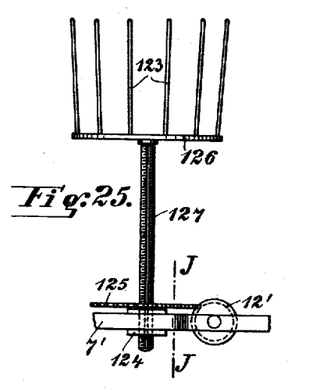
Fig. 25 illustrates a device designed to be employed in the manufacture of round baskets.
Figure 26:
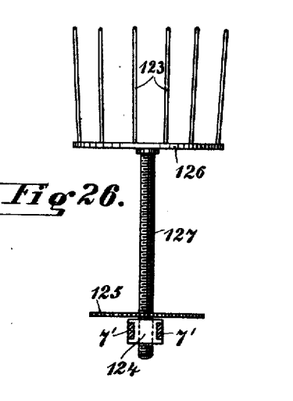
Fig. 26 is a section on the line J—J of Fig. 25.

If it is desired to make round baskets I remove the plate 8 and mount a block 124 upon the frame work 7', see Figs. 25, 26. The block 124 carries a toothed wheel 125 which is engaged by the driving worm 12'. The bottom 126 of the basket to be worked rests upon a screw threaded spindle 127 which is fixedly connected with the aforesaid gear wheel 125. The spindle 127 passes through a screw threaded bore of the block 124. When the form 12' revolves the gear wheel 125 the basket structure is turned and the weaving work proceeds in the same manner as hereinbefore described, the spindle 127 screwing itself into the block 124 and automatically lowering the bottom 126 in correspondence to the advance of the weaving work.

Figure 27:
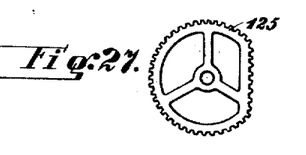
Fig. 27 shows an actuating wheel designed to be used in the manufacture of round baskets having a flattened side.
Figure 28:
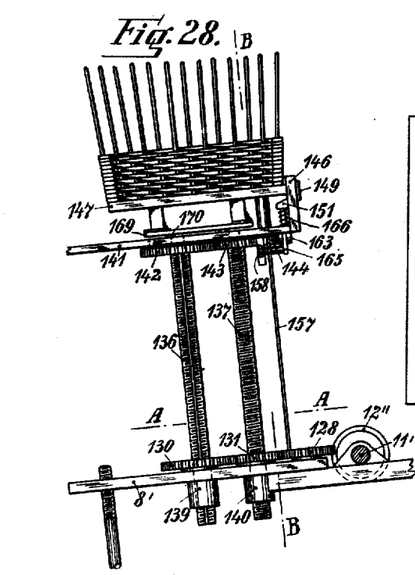
Figure 29:
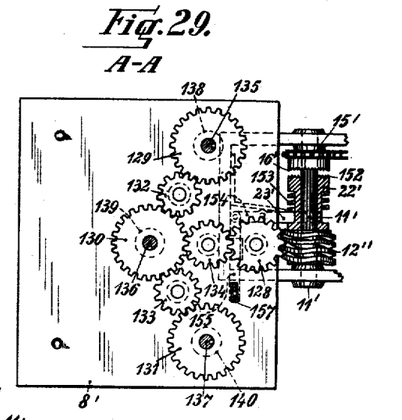
Figure 30:
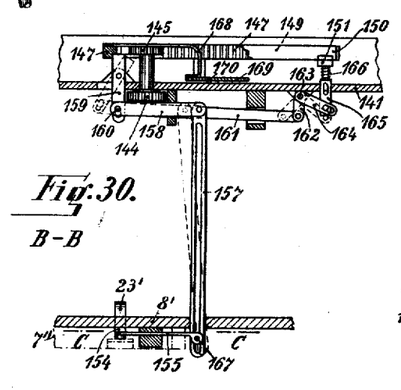
Figure 31:
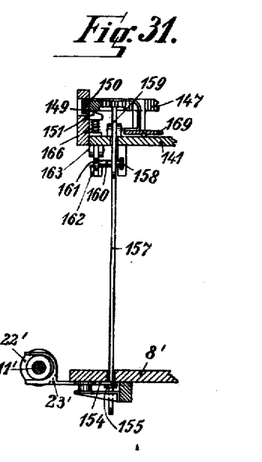
Fig. 31 is a side elevation, and Fig. 32 a sectional view on the line C—C of Fig. 30.
Figure 32:
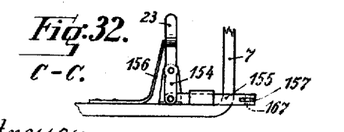
Figure 33:
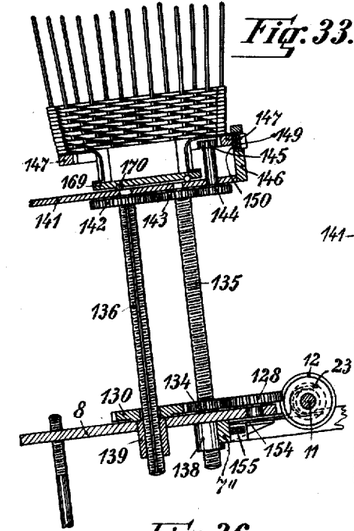
Fig. 33 is a side elevation, partly in section, and the plan views reproduced in Figs. 34, 35, and 36, show various positions of the frame.
Figure 34:
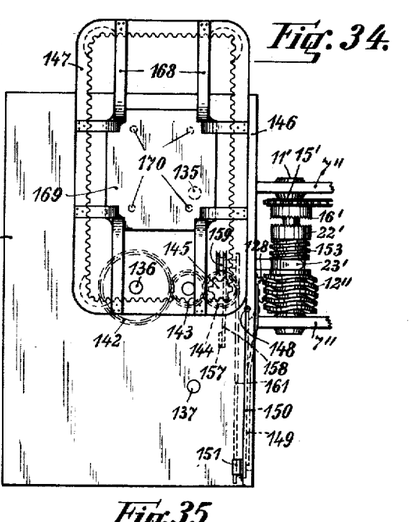
Figure 35:
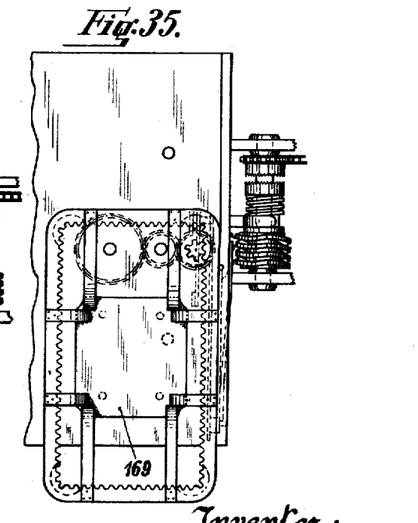
Figure 36:
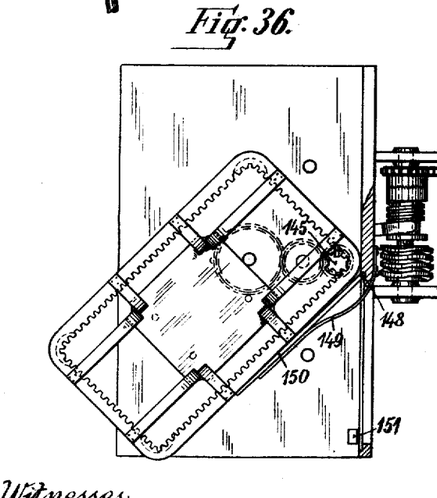

If it is desired to manufacture oval or round baskets having one flattened side, this can be performed by using the gearing wheel 125' shown in Fig. 27.

I have devised a modified construction of the mechanism for producing the movements of the basket during the weaving operation which may be applied advantageously for the manufacture of cornered baskets and is shown in Figs. 28 to 36.

Upon the adjustable table 8' I mount a spur wheel 128 which meshes with the worm 12'' fixed upon the shaft 11'. Upon the table 8' I further mount three spur wheels 129, 130, 131 of equal size between which an operative interconnection is established by intermediate wheels 132 and 133, see Fig. 29, while the spur wheels 128 and 130 are interconnected by the spur wheel 134. Thus, when the spur wheel 128 is actuated through the operation of the worm 12'' the three wheels 129, 130, 131, revolve in unison. These last mentioned gear wheels are revolubly connected with screw threaded spindles 135, 136, 137 by means of cotter keys. Underneath the said wheels I have mounted, within the table 8', hub-like parts 138, 139, 140, which are provided with internal screw threads for the reception of the respective screw threaded spindles 135, 136, 137. The upper ends of the said spindles are revolubly mounted in bore holes of a plate 141. On causing the gear wheels 129, 130, 131 to revolve in one direction, or the other, the spindles 135, 136, 137 and the plate 141 carried thereby, will be raised or lowered accordingly. A short distance from its upper end, the spindle 136 carries a spur wheel 142 which, by means of an intermediate wheel 143, is operatively connected with a spur wheel 144 (Fig. 34) which is secured on a short shaft passing through the plate 141 and carrying at its termination another spur wheel 145. On one side facing the main column of the machine, the plate 141 is provided with a guide wall 146. The plate 141 supports the frame 147 which in its shape corresponds to the shape of the basket to be manufactured and is provided with a continuous row of gear teeth on its inner edges. The aforementioned spur wheel 145 engages this internal gearing of the frame 147, which when moving is guided by the aforementioned guide wall 146.

At 148 (Fig. 36) there is mounted a lever 150 which normally has its place within a groove of the guide wall 146 and is subject to the action of a spring 149, but is normally retained within the said groove by a latch 151.

In proximity to the worm 12'' the shaft 11' carries a hub 22' which is revolubly connected with the shaft 11' by means of a cotter key but is capable of being longitudinally shifted thereon. On the side facing the sprocket wheel 15' and its clutch part 16', the hub 22' is provided with coupling teeth 152 (Fig. 29) adapted to engage the coupling teeth of the clutch part 16'.

The frame 7" is provided with a double arm lever 23', 154, of which the forked arm 23' engages the hub 22' between a shoulder of the same and a helical spring 153 encircling a contracted portion of the hub. The other arm 154 of this double arm lever is pivotally connected with a bar 155 (Figs. 30-32) slidably mounted in a bracket of the frame 7" and terminating in a forked end which engages a slotted bar 157 by means of a pin 167. The said bar 157 passes through an opening in the table 8', see Fig. 30, and with its upper end, is pivotally connected to a slide 158. The opposite end of the said slide 158 is pivotally connected with a double arm lever 159 which is fulcrumed on the plate 141 and projects with its upper end into the interior space of the frame 147 so as to contact with a side part of the frame 147 when the same is so far advanced that the gear wheel 145 is about to enter a corner portion of the frame 147. Another slide 161 is connected to the slide 158 by means of a pivot 160 and is likewise mounted in brackets of the plate 141. This slide 161 is pivotally connected with the arm 162 of an elbow lever that is fulcrumed on the plate 141 at 163. The second arm, 164, of the elbow lever is connected by a pin and slot connection to a vertically movable slide 165. The latter is operatively connected with the aforementioned latch 151 and is provided with a spring 166 which is interposed between a shoulder of the said slide and the lower face of the latch 151. By means of this spring 166 the latch is rendered yieldable independent of the action of the slide 165, while, at the same time, the latch may be operated by means of the slide 165.

A plate spring 156 (Fig. 32) tends to maintain the double arm lever 23', 154, in its normal position. The frame 147 is supported in brackets 168 which are mounted on a plate 169. Ball bearings 170, or the like, may be interposed between the plate 169 and the plate 141 to reduce friction. Since the brackets 168 are bent toward the interior of the frame 147 the plate 169 may be considerably smaller than the frame 147. This enables me to make the plate 141 narrower and shorter than would otherwise appear necessary; compare Figs. 33, 34, 35. As a matter of course, the brackets may be omitted and the frame 147 directly mounted upon the plate 141.

The mode of operation of this modified construction of the basket motion mechanism is as follows:

Operation of the worm gear 12" causes the intermediate spur wheels 132, 134, 130, to rotate the spur wheels 128, 129, 133, 131, the spindles 135, 136, 137, partaking of this movement of revolution and thereby screwing themselves down within the stationary hubs 138, 139, 140. Thus, the plate 141 is lowered in correspondence to the advance of the weaving work. Through the agency of the spur wheel 142 mounted upon the short shaft 136, and the intermediate spur wheels 143, 144, the spur wheel 145 is caused to revolve and thereby moves the frame 147 along the guide wall 146. When a corner of the frame 147 approaches the actuating wheel 145, the lever arm 159 contacts with the approaching transverse part of the frame and is pressed back thereby; see Fig. 30. This causes a shifting of the slide 158 toward the left and a rocking of the slotted bar 157 about the opening in the table 8' which acts as a fulcrum. The lower end of the bar 157 swings toward the right and draws the rod 155 in the same direction, thereby shifting the lever arm 23' against the action of the spring 156 and causing the coupling part 22' to engage the clutch 16'. This sets the sprocket wheel 15' revolving and produces the circular motion for the corner weaving as I have hereinbefore described. Through the movement of the yieldable arm 159, the elbow lever 162, 164, is simultaneously swung by means of the slide 161, resulting in drawing the latch 151 downward, whereby the lever 150 is released. The lever 150 under the action of the spring 149, facilitates the quarter-turning of the frame 147 around the wheel 145 which during this turning fills the corner of the frame. On continuing the straight line movement of the frame 147 while the same is again in contact with the guiding wall 146, the lever 150 is gradually pressed home into the groove of the guide wall 146 and is thereafter locked therein by the latch 151 which in the meantime has been returned into operative position in consequence of the stop arm 159 being restored into its normal position. Through the action of the spring 156 the coupling hub is automatically returned into engagement with worm 12" and the sprocket wheel 15' is stopped in consequence thereof.

When the position of the plate 141 is altered relative to the table 8', the stroke of the lower arm of the bar 157 is altered, likewise resulting in a variation in the movement of the double arm lever 23', 154. To compensate for these differences, I have provided the spring 153 encircling the hub 22'. However, this compensation may be obtained at other places; so for instance, may a similar spring be provided within the sliding bar 155.

In the manner, as I have described in my aforegoing specification, I may produce the bottom of the basket as well as the lid. For that purpose, it is but required to dispose the uprights star-like and revolve the same about a horizontal axis whereby the star-like disposed uprights are brought successively into a vertical position below the feeding head which lays the rods spiral-like within one plane.

While I have illustrated useful structural means for carrying my invention into effect, I desire it to be understood that the scope of my invention is not limited to the particular structural means shown; some, or all, of the motions employed for attaining the desired results may be brought about by means radically different from those shown.

I claim:

1. A basket making machine, comprising a structure for carrying the uprights for the basket, means for moving said structure in a path corresponding to the circumferential shape of the basket, a head of substantially cylindrical shape, a vertical feeding tube mounted eccentrically within said head, means for reciprocating said head, and means for oscillating the latter in substantially a horizontal plane and synchronously with said reciprocatory movement and in timed relation thereto, whereby said feeding tube is carried around successive uprights in a sinuous line.

2. A basket making machine, comprising a structure for carrying the uprights for the basket, means for moving said structure in a path corresponding to the circumferential shape of the basket, means for raising and lowering said structure, a head of substantially cylindrical shape, a vertical feeding tube mounted eccentrically within said head, means for reciprocating the latter, and means for oscillating said head in substantially a horizontal plane and synchronously with said reciprocatory movement and in timed relation thereto, whereby said feeding tube is carried around successive uprights in a sinuous line.

3. A basket making machine, comprising, in combination, a structure for carrying the uprights for the basket, means for moving said structure in a path corresponding to the circumferential shape of the basket, means for altering the vertical position of said structure during the advance of the latter within the said path, a feeding head, means for imparting a reciprocatory movement to said feeding head, means for imparting an oscillatory movement to said feeding head, and means whereby said feeding head is enabled to perform a full circular movement around a corner upright.

4. A basket making machine, comprising in combination, a structure for carrying the uprights for the basket, means for moving said structure in a path corresponding to the circumferential shape of the basket, a feeding head, comprising a part adapted to revolve about a vertical axis, a mounting for said revoluble part and adapted to swing to alternate sides in a substantially horizontal plane, and a feeding tube mounted eccentrically in said part, means for imparting a reciprocatory movement to said feeding head in a direction crossing the plane of that side wall of the basket which is in working position below said feeding head, and means for imparting an alternate swinging movement to said swingable mounting.

5. A basket making machine, comprising, in combination, a structure for carrying the uprights for the basket, means for moving said structure in a path corresponding to the circumferential shape of the basket, means for altering the vertical position of said structure, said means operating in timed relation to the advance of said structure, a feeding head, comprising a part adapted to revolve about a vertical axis, a mounting for said revoluble part and adapted to swing to alternate sides in a substantially horizontal plane, and a feeding tube mounted eccentrically in said part; means for imparting a reciprocatory movement to said feeding head in a direction crossing the plane of the basket wall below said feeding head, and means for imparting an alternate swinging movement to said swingable mounting carrying said feeding tube.

6. A basket making machine, comprising, in combination, a structure for carrying the uprights for the basket, a feeding head disposed above said structure, means for advancing said structure so that the uprights carried thereon pass successively below said feeding head, means for altering the vertical position of said structure in timed relation to the advance of the latter, said feeding head comprising a part adapted to revolve about a vertical axis, a mounting for said revoluble part and adapted to swing to alternate sides in a substantially horizontal plane, a yielding coupling between said part and said mounting, and a feeding tube mounted eccentrically in said revoluble part; means for imparting a reciprocatory movement to said feeding head in timed relation to the advance of said structure and in a direction crossing the plane in which the uprights are advanced below said feeding head, means for imparting an alternate swinging movement to said swingable mounting carrying said feeding tube, means for automatically stopping the advance of said structure when a corner upright is standing below said feeding head, means for causing said structure to perform a quarter-turn about the respective corner upright, means for automatically restarting the advance of said structure on conclusion of said quarter-turn, and means whereby said revoluble part of said feeding head is enabled to perform an independent full circular movement around a corner upright while the advance of said structure is interrupted.

7. A basket making machine, comprising, in combination, a structure for carrying the uprights for the basket, a feeding head disposed above said structure, means for moving said structure so that each upright is caused to pass below said feeding head, said feeding head comprising a part adapted to revolve about a vertical axis, a mounting for said revoluble part and adapted to swing to alternate sides in a substantially horizontal plane, a yielding coupling between said part and said mounting, and a feeding tube mounted eccentrically in said revoluble part; means for imparting a reciprocatory movement to said feeding head in a direction crossing the plane in which said uprights are passing below said feeding head, means for imparting an alternate swinging movement to said swingable mounting carrying said feeding tube, a pair of stays for the uprights and adapted to alternately engage successive uprights from alternate sides while the uprights are passing below said feeding head, and means for causing said stays to alternately engage successive uprights, said means acting in timed relation to the reciprocatory and oscillatory movements of said swingable mounting and so that each upright is being stayed from the side opposite to the relative position of said feeding tube.

8. A basket making machine, comprising, in combination, a structure for carrying the uprights for the basket, a feeding head disposed above said structure, means for moving said structure so that each upright is caused to pass below said feeding head, means for altering the vertical position of said structure, said means operating in timed relation to the advance of said structure, said feeding head comprising a part adapted to revolve about a vertical axis, a mounting for said revoluble part and adapted to swing to alternate sides in a substantially horizontal plane, a yielding coupling between said part and said mounting, and a feeding tube mounted eccentrically in said part; means for imparting a reciprocatory movement to said feeding head in a direction crossing the plane in which said uprights are passing below said feeding head, means for imparting an alternate swinging movement to said swingable mounting carrying said feeding tube, a pair of stays for the uprights and adapted to alternately engage successive uprights from alternate sides while the uprights are passing below said feeding head, and means for causing said stays to alternately engage successive uprights, said means acting in timed relation to the reciprocatory and oscillatory movements of said swingable mounting and so that each upright is being stayed from the side opposite to the relative position of said feeding tube.

9. A basket making machine, comprising, in combination, a structure for carrying the uprights for the basket, a feeding head disposed above said structure, means for advancing said structure so that each upright is caused to pass below said feeding head, means for altering the vertical position of said structure in timed relation to the advance of the latter, said feeding head comprising a part adapted to revolve about a vertical axis, a mounting for said revoluble part and adapted to swing to alternate sides in a substantially horizontal plane, a yielding coupling between said part and said mounting, and a feeding tube adjustably mounted eccentrically in said revoluble part, means for imparting a reciprocatory movement to said feeding head in timed relation to the advance of said structure and in a direction crossing the plane of movement of the uprights while passing below said feeding head, means for imparting an alternate swinging movement to said swingable mounting during the reciprocation of said feeding head, means for automatically stopping the advance of said structure when a corner upright is standing below said feeding head, means for causing said structure to perform a quarter-turn about the respective corner upright, means for automatically restarting the advance of said structure on conclusion of said quarter-turn, means whereby said revoluble part of said feeding head is enabled to perform a full circular movement around a corner upright, a pair of stays for the uprights and adapted to alternately engage successive uprights from alternate sides while the uprights are passing below said feeding head, and means for causing said stays to alternately engage successive uprights, said means acting in timed relation to the reciprocatory and oscillatory movements of said swingable mounting and so that each upright is being stayed from the side opposite to the relative position of said feeding tube.

10. A basket making machine, comprising, in combination, a structure for carrying the uprights for the basket, a feeding head disposed above said structure, means for moving said structure so that each upright is caused to pass below said feeding head, said feeding head comprising a part adapted to revolve about a vertical axis, a mounting for said revoluble part and adapted to swing to alternate sides in a substantially horizontal plane, a yielding coupling between said part and said mounting, and a feeding tube mounted eccentrically in said revoluble part; means for imparting a reciprocatory movement to said feeding head in a direction crossing the plane in which the uprights are passing below said feeding head, means for imparting an alternate swinging movement to said swingable mounting carrying said feeding tube, a pair of stays for the uprights and adapted to alternately engage successive uprights from alternate sides while the uprights are passing below said feeding head, a carrier for said pair of stays, said carrier being supported on two movable pivots disposed in a substantially horizontal plane, means for imparting a reciprocatory movement to one of said pivots, means for imparting a reciprocatory movement to the second of said pivots, both these last named means acting in timed relations to the movements imparted to said feeding head, whereby said stays are caused to engage said uprights from the side opposite to the relative position of said feeding tube.

11. A basket making machine, comprising, in combination, a structure for carrying the uprights for the basket, a feeding head disposed above said structure, means for moving said structure so that each upright is caused to pass below said feeding head, means for altering the vertical position of said structure, said means operating in timed relation to the advance of said structure, said feeding head comprising a part adapted to revolve about a vertical axis, a mounting for said revoluble part and adapted to swing to alternate sides in a substantially horizontal plane, a yielding coupling between said part and said mounting, and a feeding tube mounted eccentrically in said part; means for imparting a reciprocatory movement to said feeding head in a direction crossing the plane in which said uprights are passing below said feeding head, means for imparting an alternate swinging movement to said swingable mounting carrying said feeding tube, a pair of stays for the uprights and adapted to alternately engage successive uprights from alternate sides while the uprights are passing below said feeding head, a carrier for said pair of stays, said carrier being supported on two movable pivots disposed in a substantially horizontal plane, means for imparting a reciprocatory movement to one of said pivots, means for imparting a reciprocatory movement to the second of said pivots, both these last named means acting in timed relations to the movements imparted to said feeding head, whereby said stays are caused to engage said uprights from the side opposite to the relative position of said feeding tube.

12. A basket making machine, comprising, in combination, a structure for carrying the uprights for the basket, a feeding head disposed above said structure, means for advancing said structure so that each upright is caused to pass below said feeding head, means for altering the vertical position of said structure in timed relation to the advance of the latter, said feeding head comprising a part adapted to revolve about a vertical axis, a mounting for said revoluble part and adapted to swing to alternate sides in a substantially horizontal plane, a yielding coupling between said part and said mounting, and a feeding tube adjustably mounted eccentrically in said revoluble part, means for imparting a reciprocatory movement to said feeding head in timed relation to the advance of said structure and in a direction crossing the plane of movement of the uprights while passing below said feeding head, means for imparting an alternate swinging movement to said swingable mounting during the reciprocation of said feeding head, means for automatically stopping the advance of said structure when a corner upright is standing below said feeding head, means for causing said structure to perform a quarter-turn about the respective corner upright, means for automatically restarting the advance of said structure on conclusion of said quarter-turn, means whereby said revoluble part of said feeding head is enabled to perform a full circular movement around a corner upright, a pair of stays for the uprights and adapted to alternately engage successive uprights from alternate sides while the uprights are passing below said feeding head, a carrier for said pair of stays, said carrier being supported on two movable pivots disposed in a substantially horizontal plane, means for imparting a reciprocatory movement to one of said pivots, means for imparting a reciprocatory movement to the second of said pivots, both these last named means acting in timed relations to the movements imparted to said feeding head, whereby said stays are caused to engage said uprights from the side opposite to the relative position of said feeding tube.

13. A basket making machine, comprising in combination, a frame-like rack, a structure thereon for carrying the uprights of the basket, a relatively stationary actuator for said rack, a substantially cylindrical head disposed above said structure, means for guiding said rack so that the uprights pass successively below said head, means for altering the vertical position of said structure during the advance of said rack in timed relation thereto, a vertical feeding tube mounted eccentrically within said head, means for reciprocating said head, and means for oscillating said head in substantially a horizontal plane and synchronously with said reciprocatory movement and in timed relation thereto, whereby said feeding tube is carried around successive uprights in a sinuous line.

14. A basket making machine, comprising, in combination, a frame-like rack, a structure thereon for carrying the uprights for the basket, a relatively stationary actuator for said rack, a feeding head disposed above said structure, means for guiding said rack so that the uprights pass successively below said feeding head, means for altering the vertical position of said structure during the advance of said rack and in timed relation thereto, means for stopping the advance of said rack when a corner upright is standing below said feeding head, means for turning said rack about a corner upright, means for restarting the advance of said rack on conclusion of said last-named turning movement, means for imparting a reciprocatory movement to said feeding head in timed relation to the advance of said rack, means for simultaneously imparting an oscillatory movement to said feeding head, and means whereby said feeding head is enabled to perform an independent circular movement around a corner upright.

15. A basket making machine, comprising, in combination, a frame mounted on horizontal pivots, a frame-like rack movably supported on said frame, a structure on said rack and adapted to carry the uprights for the basket, an actuator for said rack and mounted on said frame, a feeding head disposed above said structure, means for guiding said rack so that the uprights pass successively below said feeding head, means for varying the pivotal position of said frame whereby said uprights can be caused to pass below said feeding head in a vertical position irrespective of their natural inclination, means for altering the vertical position of said structure during the advance of said rack and in timed relation thereto, means for imparting a reciprocatory movement to said feeding head in timed relation to the advance of said rack, and means for simultaneously imparting an oscillatory movement to said feeding head and in timed relation to the advance of said rack.

16. A basket making machine, comprising, in combination, a frame mounted on horizontal pivots, a frame-like rack movably supported on said frame, a structure on said rack and adapted to carry the uprights for the basket, an actuator for said rack and mounted on said frame, a feeding head disposed above said structure, means for guiding said rack so that the uprights pass successively below said feeding head, means for varying the pivotal position of said frame whereby said uprights can be caused to pass below said feeding head in a vertical position irrespective of their natural inclination, means for altering the vertical position of said structure during the advance of said rack and in timed relation thereto, means for imparting a reciprocatory movement to said feeding head in timed relation to the advance of said rack, means for simultaneously imparting an oscillatory movement to said feeding head and in timed relation to the advance of said rack, and means for varying the vertical position of said feeding head.

17. A basket making machine, comprising, in combination, a frame mounted on horizontal pivots, a frame-like rack movably supported on said frame, a structure on said rack and adapted to carry the uprights for the basket, an actuator for said rack and mounted on said frame, a feeding head disposed above said structure, means for guiding said rack so that the uprights pass successively below said feeding head, means for varying the pivotal position of said frame whereby said uprights can be caused to pass below said feeding head in a vertical position irrespective of their natural inclination, means for altering the vertical position of said structure during the advance of said rack and in timed relation thereto, means for stopping the advance of said rack when a corner upright is standing below said feeding head, means for turning said rack about a corner upright, means for restarting the advance of said rack on conclusion of said last-named turning movement, means for imparting a reciprocatory movement to said feeding head in timed relation to the advance of said rack, means for simultaneously imparting an oscillatory movement to said feeding head and in timed relation to the advance of said rack, and means whereby said feeding head is enabled to perform an independent circular movement around a corner upright, and means for varying the vertical position of said feeding head.

18. A basket making machine, comprising, in combination, a frame mounted on horizontal pivots, a frame-like rack movably supported thereon, a structure mounted on said rack and adapted to carry the uprights for the desired basket, an actuator for said rack and mounted on said frame, a feeding head disposed above said structure and including a downward extending feeding tube, means for guiding said rack so that the uprights are caused to pass successively below said feeding tube, means for varying the pivotal position of said frame for the purpose of causing the uprights to pass below the feeding tube in a vertical position, means for varying the vertical position of said structure in timed relation to the advance of said rack, means for reciprocating said feeding head in timed relation to the advance of said rack, means for simultaneously oscillating said feeding head in timed relation to the advance of said rack, means for causing said feeding head to perform a full circular movement around a corner upright, a coupling device operatively inserted between said actuator and said last named means and adapted to disconnect said actuator from said rack and operatively connect said actuator to said last named means when a corner upright is getting into position below said feeding head, and means for reversing the last named adjustment of said coupling device when said feeding head has concluded the said full circular movement around the said corner upright, whereby said rack is again actuated by said actuator.

In testimony whereof I have hereto set my hand.

CARL SCHWEDLER.

Witnesses:
HENRY HASPER,
ALLEN F. JENNINGS.

Copies of this patent may be obtained for five cents each, by addressing the "Commissioner of Patents, Washington, D. C."